US008630248B2

(12) United States Patent
Seo et al.

(10) Patent No.: US 8,630,248 B2
(45) Date of Patent: Jan. 14, 2014

(54) METHOD AND APPARATUS FOR PERFORMING HARQ IN MULTIPLE CARRIER SYSTEM

(75) Inventors: Dong Youn Seo, Anyang-si (KR); Suck Chel Yang, Anyang-si (KR); Joon Kui Ahn, Anyang-si (KR)

(73) Assignee: LG Electronics Inc., Seoul (KR)

( * ) Notice: Subject to any disclaimer, the term of this patent is extended or adjusted under 35 U.S.C. 154(b) by 70 days.

(21) Appl. No.: 13/384,030

(22) PCT Filed: Jul. 16, 2010

(86) PCT No.: PCT/KR2010/004655
§ 371 (c)(1),
(2), (4) Date: Jan. 13, 2012

(87) PCT Pub. No.: WO2011/008049
PCT Pub. Date: Jan. 20, 2011

(65) Prior Publication Data
US 2012/0113946 A1    May 10, 2012

Related U.S. Application Data

(60) Provisional application No. 61/226,278, filed on Jul. 16, 2009.

(30) Foreign Application Priority Data

Jul. 15, 2010    (KR) .................. 10-2010-0068272

(51) Int. Cl.
*H04W 4/00*    (2009.01)
(52) U.S. Cl.
USPC .......................................... 370/329; 370/341

(58) Field of Classification Search
None
See application file for complete search history.

(56) References Cited

U.S. PATENT DOCUMENTS

| | | | | |
|---|---|---|---|---|
| 8,009,606 | B2* | 8/2011 | Seo et al. .................. | 370/319 |
| 8,402,336 | B2* | 3/2013 | McBeath et al. .......... | 714/749 |
| 8,411,633 | B2* | 4/2013 | Seo et al. .................. | 370/329 |
| 8,432,859 | B2* | 4/2013 | Lee et al. .................. | 370/329 |
| 2008/0002688 | A1 | 1/2008 | Kim et al. | |
| 2008/0117891 | A1 | 5/2008 | Damnjanovic et al. | |
| 2008/0232307 | A1* | 9/2008 | Pi et al. .................... | 370/328 |
| 2010/0040001 | A1* | 2/2010 | Montojo et al. ........... | 370/329 |
| 2010/0067468 | A1* | 3/2010 | Ho et al. ................... | 370/329 |
| 2010/0074204 | A1* | 3/2010 | Meylan ..................... | 370/329 |
| 2010/0172290 | A1* | 7/2010 | Nam et al. ................ | 370/328 |
| 2010/0235705 | A1 | 9/2010 | Kim et al. | |
| 2010/0257419 | A1* | 10/2010 | Sung et al. ................ | 714/748 |
| 2010/0312994 | A1* | 12/2010 | McBeath et al. .......... | 712/220 |
| 2011/0116457 | A1* | 5/2011 | Damnjanovic et al. .... | 370/329 |

(Continued)

FOREIGN PATENT DOCUMENTS

| | | |
|---|---|---|
| KR | 10-2008-0030941 A | 4/2008 |
| KR | 10-2008-0065880 A | 7/2008 |
| KR | 10-2009-0060304 A | 6/2009 |
| WO | WO 2007/024098 A1 | 3/2007 |

*Primary Examiner* — Phirin Sam
(74) *Attorney, Agent, or Firm* — Birch, Stewart, Kolasch & Birch LLP (57) ABSTRACT

A method and apparatus for performing hybrid automatic repeat request (HARQ) in a multiple carrier system are provided. A user equipment performs an HARQ process in a source component carrier. When the user equipment receives a management message regarding a transfer from the source component carrier to a target component carrier, the user equipment subsequently performs the HARQ process in the target component carrier.

10 Claims, 10 Drawing Sheets

(56) References Cited

U.S. PATENT DOCUMENTS

| | | | |
|---|---|---|---|
| 2011/0176502 A1* | 7/2011 | Chung et al. | 370/329 |
| 2012/0026936 A1* | 2/2012 | Zhang et al. | 370/315 |
| 2012/0327891 A1* | 12/2012 | Nam et al. | 370/329 |
| 2013/0182679 A1* | 7/2013 | Seo et al. | 370/330 |

\* cited by examiner

METHOD AND APPARATUS FOR PERFORMING HARQ IN MULTIPLE CARRIER SYSTEM

Cross Reference to Related Applications:

This application is the National Phase of PCT/KR2010/004655 filed on Jul. 16, 2010, which claims priority under 35 U.S.C. 119(e) to U.S. Provisional Application No. 61/226,278 filed on Jul. 16, 2009 and under 35 U.S.C. 119(a) to Patent Application Ser. No. 10-2010-0068272 filed in Republic of Korea on Jul. 15, 2010, all of which are hereby expressly incorporated by reference into the present application.

TECHNICAL FIELD

The present invention relates to wireless communications, and more particularly, to an apparatus and method for supporting multiple carriers in a wireless communication system.

BACKGROUND ART

An error compensation scheme is used to secure communication reliability. Examples of the error compensation scheme include a forward error correction (FEC) scheme and an automatic repeat request (ARQ) scheme. In the FEC scheme, errors in a receiving end are corrected by attaching an extra error correction code to information bits. The FEC scheme has an advantage in that time delay is small and no information is additionally exchanged between a transmitting end and the receiving end but also has a disadvantage in that system efficiency deteriorates in a good channel environment. The ARQ scheme has an advantage in that transmission reliability can be increased but also has a disadvantage in that time delay occurs and system efficiency deteriorates in a poor channel environment.

A hybrid automatic repeat request (HARQ) scheme is a combination of the FEC scheme and the ARQ scheme. In the HARQ scheme, it is determined whether an unrecoverable error is included in data received by a physical layer, and retransmission is requested upon detecting the error, thereby improving performance.

If the error is not detected from the received data, a receiver transmits a positive-acknowledgement (ACK) signal as a reception acknowledgement to report to a transmitter that reception is successful. If the error is detected from the received data, the receiver transmits a negative-acknowledgement (NACK) signal as the reception acknowledgement to report to the transmitter that the error is detected. The transmitter can retransmit the data upon receiving the NACK signal.

In a typical wireless communication system, only one carrier is considered even if a bandwidth between an uplink and a downlink is configured differently from each other. The carrier is defined with a center frequency and a bandwidth. A multiple carrier system uses a plurality of component carriers having a smaller bandwidth than a full bandwidth.

Long term evolution (LTE) based on 3rd generation partnership project (3GPP) technical specification (TS) release 8 is a most dominant next mobile communication standard.

The 3GPP LTE system supports only one bandwidth (i.e., one carrier) among {1.4, 3, 5, 10, 15, 20} MHz. In order to support a full bandwidth of 40 MHz, the multiple carrier system uses two carriers having a bandwidth of 20 MHz or uses 3 carriers respectively having bandwidths of 20 MHz, 15 MHz, and 5 MHz.

The multiple carrier system can support backward compatibility with respect to legacy systems, and significantly increases a data rate by using multiple carriers.

Even if a plurality of component carriers are supported, a base station (BS) and a user equipment (UE) do not use all component carriers in communication. The BS and the UE use assigned component carriers in communication among a plurality of component carriers.

For effective management of the multiple carriers, the BS and the UE can remove/change/add the assigned component carriers. However, a method of processing HARQ currently being performed has not been introduced for a case where a component carrier in which HARQ is currently being performed is removed or changed. When HARQ is suspended as the component carrier is transferred, the receiver has no choice but to discard previously received data, which may lead to inefficiency.

DISCLOSURE OF INVENTION

Technical Problem

The present invention provides a method and apparatus for performing hybrid automatic repeat request (HARQ) in a multiple carrier system.

Solution to Problem

In an aspect, a method of performing hybrid automatic repeat request (HARQ) in a multiple carrier system is provided. The method includes performing an HARQ process in a source component carrier, receiving a management message regarding a transfer from the source component carrier to a target component carrier, and subsequently performing the HARQ process in the target component carrier.

The step of the performing of the HARQ process in the target component carrier may include receiving a first downlink grant on a downlink control channel through the source component carrier, receiving a downlink transfer block on the downlink data channel indicated by a resource allocation in the first downlink grant, and transmitting a positive-acknowledgement (ACK)/negative-acknowledgement (NACK) signal for the downlink transport block. The first downlink grant may include an HARQ process index (HID) indicating an HARQ process index of the HARQ process and a new data indicator (NDI) indicating whether retransmission is performed.

The step of the subsequently performing the HARQ process in the target component carrier may include receiving a second downlink grant on the downlink control channel through the target component carrier. If the HID in the second downlink grant indicates the same HARQ process index and the NDI in the second downlink grant indicates retransmission, the HARQ process may be subsequently performed.

If the NDI value in the second downlink grant may be set to 1, retransmission may be indicated.

The step of the performing of the HARQ process in the target component carrier may include receiving a first uplink grant on the downlink control channel through the source component carrier, transmitting an uplink transport block on the uplink data channel indicated by a resource allocation in the first uplink grant, and receiving an ACK/NACK signal for the uplink transport block. The first uplink grant may include an NDI indicating whether the uplink transport block is retransmitted.

The method may further include suspending the HARQ process after receiving the management message regarding the transfer from the source component carrier to the target component carrier.

The HARQ process index of the HARQ process may be determined according to an uplink subframe in which the uplink control channel is transmitted.

The step of the subsequently performing of the HARQ process in the target component carrier may include receiving a second uplink grant over the downlink control channel by using the target component carrier. If the uplink subframe indicated in the second uplink grant indicates the same HARQ process index as the HARQ process index of the HARQ process and if the NDI in the second uplink grant indicates retransmission, the HARQ process may be subsequently performed.

The method may further include receiving a semi-persistent scheduling (SPS) configuration used in the source component carrier and the target component carrier.

In another aspect, a user equipment includes a radio frequency (RF) unit for transmitting and receiving a radio signal, and a processor, coupled to the RF unit, for performing hybrid automatic repeat request (HARQ), and configured to perform an HARQ process in a source component carrier, receive a management message regarding a transfer from the source component carrier to a target component carrier, and subsequently perform the HARQ process in the target component carrier.

Advantageous Effects of Invention

Even if a transfer occurs from one component carrier to another, hybrid automatic repeat request (HARQ) performed in a previous component carrier can be subsequently performed in a new component carrier. Therefore, a multiple carrier system can obtain an HARQ retransmission gain.

MODE FOR THE INVENTION

A user equipment (UE) may be fixed or mobile, and may be referred to as another terminology, such as a mobile station (MS), a mobile terminal (MT), a user terminal (UT), a subscriber station (SS), a wireless device, a personal digital assistant (PDA), a wireless modem, a handheld device, etc.

A base station (BS) is generally a fixed station that communicates with the UE and may be referred to as another terminology, such as an evolved node-B (eNB), a base transceiver system (BTS), an access point, etc.

Respective BSs provide communication services to specific geographical regions (generally referred to as cells). The cell can be divided into a plurality of regions (referred to as sectors).

Hereinafter, a downlink (DL) implies communication from the BS to the UE, and an uplink (UL) implies communication from the UE to the BS. In the DL, a transmitter may be a part of the BS, and a receiver may be a part of the UE. In the UL, the transmitter may be a part of the UE, and the receiver may be a part of the BS.

Figure 1:
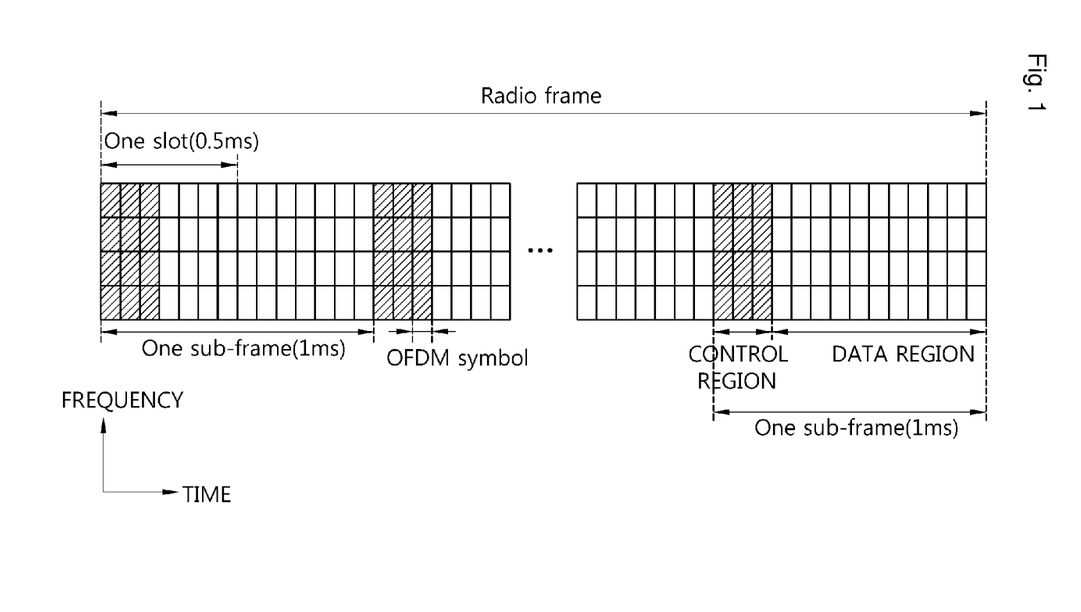
FIG. 1 shows a radio frame structure in 3rd generation partnership project (3GPP) long term evolution (LTE).

FIG. 1 shows a radio frame structure in 3rd generation partnership project (3GPP) long term evolution (LTE). The section 6 of 3GPP TS 36.211 V8.7.0 (2009 May) "Evolved Universal Terrestrial Radio Access (E-UTRA); Physical Channels and Modulation (Release 8)" may be incorporated herein by reference.

A radio frame consists of 10 subframes indexed from 0 to 9. One subframe consists of 2 slots. A time required for transmitting one subframe is defined as a transmission time interval (TTI). For example, one subframe may have a length of 1 millisecond (ms), and one slot may have a length of 0.5 ms.

One slot may include a plurality of orthogonal frequency division multiplexing (OFDM) symbols in a time domain. Since the 3GPP LTE uses orthogonal frequency division multiple access (OFDMA) in DL transmission, the OFDM symbol is only for expressing one symbol period in the time domain, and there is no restriction in a multiple-access scheme or terminology. For example, the OFDM symbol may also be referred to as another terminology such as a single carrier frequency division multiple access (SC-FDMA) symbol, a symbol period, etc.

Although it is described that one slot includes 7 OFDM symbols for example, the number of OFDM symbols included in one slot may vary depending on a length of a cyclic prefix (CP). According to 3GPP TS 36.211 V8.7.0, in case of a normal CP, one subframe includes 7 OFDM symbols, and in case of an extended CP, one subframe includes 6 OFDM symbols.

A resource block (RB) is a resource allocation unit, and includes a plurality of subcarriers in one slot. For example, if one slot includes 7 OFDM symbols in the time domain and an RB includes 12 subcarriers in a frequency domain, one RB can include 7?12 resource elements (REs).

A DL subframe is divided into a control region and a data region in the time domain. The control region includes up to first 4 OFDM symbols in a first slot of the subframe, but the number of OFDM symbols included in the control region may vary. A physical downlink control channel (PDCCH) is allocated to the control region. A physical downlink shared channel (PDSCH) is allocated to the data region.

As disclosed in 3GPP TS 36.211 V8.7.0, physical channels in the 3GPP LTE can be divided into data channels and control channels. The data channels include a physical downlink shared channel (PDSCH) and a physical uplink shared channel (PUSCH). The control channels include a physical downlink control channel (PDCCH), a physical control format indicator channel (PCFICH), a physical hybrid-ARQ indicator channel (PHICH), and a physical uplink control channel (PUCCH).

The PCFICH transmitted in the first OFDM symbol of the subframe carries a control format indicator (CFI) indicating the number of OFDM symbols (i.e., a size of the control region) used in transmission of control channels in the subframe. A UE first receives the CFI on the PCFICH, and thereafter monitors the PDCCH.

The PHICH carries a positive-acknowledgement (ACK)/negative-acknowledgement (NACK) signal for hybrid automatic repeat request (HARQ). The ACK/NACK signal for a UL transport block on the PUSCH transmitted by the UE is transmitted on the PHICH.

Control information transmitted through the PDCCH is referred to as downlink control information (DCI). The DCI may include a PDSCH resource allocation (referred to as a DL grant), a PUSCH resource allocation (referred to as a UL grant), a set of transmit power control commands for individual UEs in any UE group, and/or activation of a voice over Internet protocol (VoIP).

The DCI on the PDCCH is received by using blind decoding. A plurality of candidate PDCCHs can be transmitted in the control region of one subframe. The UE monitors the plurality of candidate PDCCHs in every subframe. Herein, monitoring is an operation in which the UE attempts decoding of each PDCCH according to a format of PDCCH to be monitored. The UE monitors a set of PDCCH candidates in a subframe to find its own PDCCH. For example, if there is no cyclic redundancy check (CRC) error detected by performing de-making on an identifier (i.e., cell-radio network temporary identifier (RNTI)) of the UE in a corresponding PDCCH, the UE detects this PDCCH as a PDCCH having a DCI of the UE.

The control region in the subframe includes a plurality of control channel elements (CCEs). The CCE is a logical allocation unit used to provide the PDCCH with a code rate depending on a wireless channel. The CCE corresponds to a plurality of resource element groups (REGs). The REG includes a plurality of REs. According to a relation between the number of CCEs and the code rate provided by the CCEs, the PDCCH format and a possible number of bits of the PDCCH are determined.

In order to receive DL data, the UE first receives a DL resource allocation on the PDCCH. When PDCCH detection is successful, the UE reads the DCI on the PDCCH. By using the DL resource allocation in the DCI, DL data on the PDSCH is received. In addition, in order to transmit UL data, the UE first receives a UL resource allocation on the PDCCH. When PDCCH detection is successful, the UE reads the DCI on the PDCCH. By using the UL resource allocation in the DCI, UL data on the PUSCH is transmitted.

Now, HARQ in 3GPP LTE will be described.

The 3GPP LTE uses synchronous HARQ in UL transmission, and uses asynchronous HARQ in DL transmission. In the synchronous HARQ, retransmission timing is fixed. In the asynchronous HARQ, the retransmission timing is not fixed. That is, in the synchronous HARQ, initial transmission and retransmission are performed with an HARQ period.

Figure 2:
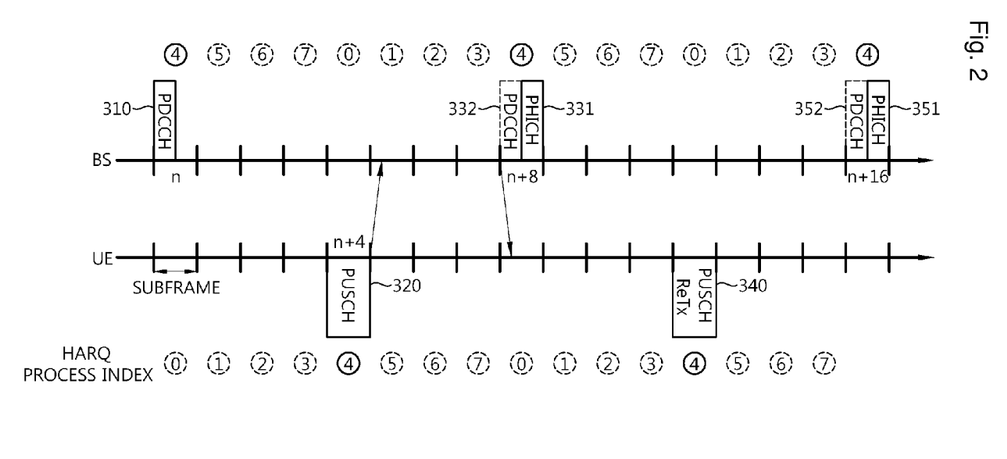
FIG. 2 shows uplink synchronous hybrid automatic repeat request (HARQ) in 3GPP LTE.

FIG. 2 shows UL synchronous HARQ in 3GPP LTE.

A UE receives an initial UL grant on a PDCCH 310 from a BS in an n-th subframe.

The UE transmits a UL transport block over a PUSCH 320 by using the initial UL grant in an (n+4)-th subframe.

The BS sends an ACK/NACK signal for the UL transport block on a PHICH 331 in an (n+8)-th subframe. The ACK/NACK signal indicates a reception acknowledgement for the UL transport block. The ACK signal indicates a reception success, and the NACK signal indicates a reception failure. When the ACK/NACK signal is the NACK signal, the BS may send a retransmission UL grant on a PDCCH 332, or may not send an additional UL grant.

Upon receiving the NACK signal, the UE sends a retransmission block on a PUSCH 340 in an (n+12)-th subframe. For the transmission of the retransmission block, if the retransmission UL grant is received over the PDCCH 332, the UE uses the retransmission UL grant, and if the retransmission UL grant is not received, the UE uses the initial UL grant.

The BS sends an ACK/NACK signal for the UL transport block on a PHICH 351 in an (n+16)-th subframe. When the ACK/NACK signal is the NACK signal, the BS may send a retransmission UL grant on a PDCCH 352, or may not send an additional UL grant.

After initial transmission performed in the (n+4)-th subframe, retransmission is performed in the (n+12)-th subframe, and thus synchronous HARQ is performed with an HARQ period corresponding to 8 subframes.

Therefore, in the 3GPP LTE, 8 HARQ processes can be performed, and the respective HARQ processes are indexed from 0 to 7.

The BS and the UE implicitly determine an HARQ process index on the basis of a subframe in which the initial UL transport block is transmitted. That is, the BS and the UE do not exchange additional signaling for the HARQ process index. The aforementioned example shows a case where HARQ is performed on the basis of the (n+4)-th subframe having an HARQ process index 4.

Figure 3:
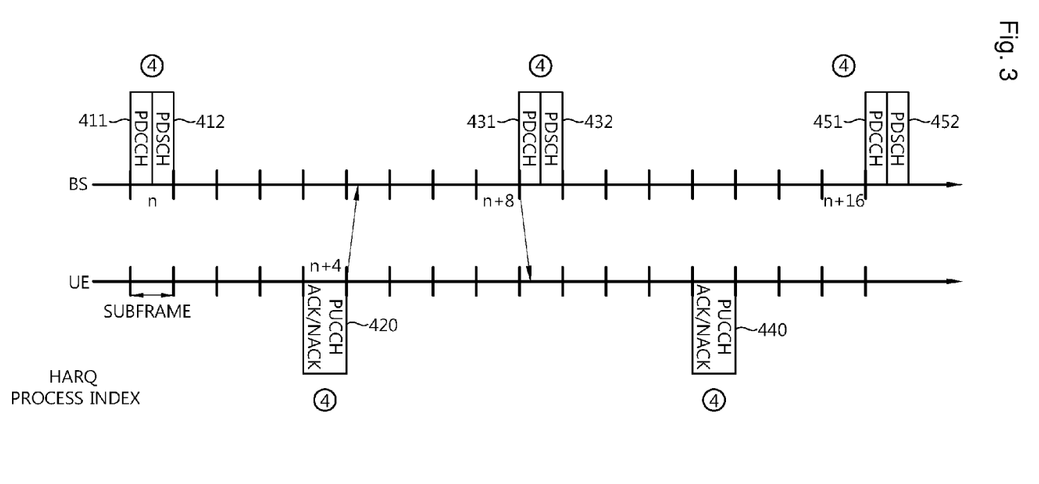
FIG. 3 shows downlink asynchronous HARQ in 3GPP LTE.

FIG. 3 shows DL asynchronous HARQ in 3GPP LTE.

A BS transmits a DL transport block to a UE over a PDSCH 412 indicated by a DL grant over a PDCCH 411 in an n-th subframe.

The UE sends an ACK/NACK signal over a PUCCH 420 in an (n+4)-th subframe. A resource of the PUCCH 420 used in transmission of the ACK/NACK signal is determined based on a resource of the PDCCH 411 (e.g., an index of a first CCE used in transmission of the PDCCH 411).

Even if the NACK signal is received from the UE, the BS does not necessarily perform retransmission in an (n+8)-th subframe unlike in the UL HARQ. Herein, a retransmission block is transmitted over a PDSCH 432 indicated by a DL grant over a PDCCH 431 in an (n+9)-th subframe.

The UE sends an ACK/NACK signal over a PUCCH 440 in an (n+13)-th subframe.

According to asynchronous HARQ, the BS does not necessarily perform retransmission in a predetermined period even if a retransmission request of the UE is received.

In order for the BS and the UE to share an HARQ process index, a DL grant includes not only a DL resource allocation but also the HARQ process index (including an HARQ process index 4 in the present embodiment) and a new data indicator (NDI). The NDI indicates whether a current DL grant is for new transmission or for retransmission. If an NDI value included in the currently received DL grant is toggled from an NDI value included in a previously received DL grant, it indicates a DL grant for new transmission. If the NDI value is not toggled, it indicates a DL grant for retransmission.

Meanwhile, to transmit a specific amount of traffic with a specific period such as a voice over Internet protocol (VoIP), semi-persistent scheduling (SPS) uses a resource allocation determined according to a predetermined period or a modulation and coding scheme (MCS).

Figure 4:
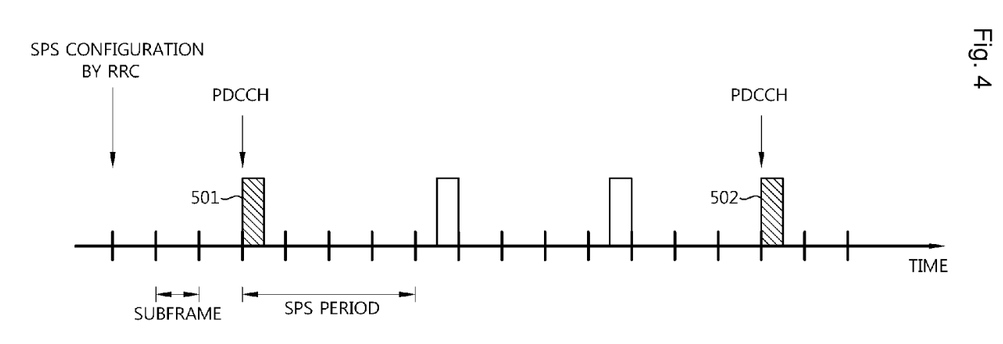
FIG. 4 shows semi-persistent scheduling (SPS) in 3GPP LTE.

FIG. 4 shows SPS in 3GPP LTE. Although DL SPS is described herein, the present invention can equally apply to UL SPS.

First, a BS sends an SPS configuration to a UE by using a radio resource control (RRC) message. The SPS configuration includes an SPS-C-RNTI and an SPS period. Herein, the SPS period is 4 subframes.

Even if the SPS is configured, the SPS is not immediately performed. The UE monitors a PDCCH 501 in which a CRC is masked to the SPS-C-RNTI, and performs the SPS after the SPS is activated. An NDI included in a DCI on the PDCCH 501 is used for SPS validation. When the NDI is set to 0, SPA activation or SPS deactivation is indicated by combination of other fields (e.g. a transmit power command (TPC), a cyclic shift of demodulation reference signal (DMRS), a modulation and coding scheme (MCS), a redundancy version (RV), a HARQ process number, resource allocation) in the DCI.

When the SPS is activated, the UE receives a transport block on a PDSCH at the SPS period even if the DL grant on the PDCCH is not received.

Thereafter, the UE monitors a PDCCH 502 in which the CRC is masked to the SPSRNTI, and confirms inactivation of the SPS.

Now, a multiple carrier system will be described.

To support a higher data rate, a multiple carrier system supporting a plurality of component carriers (CCs) is taken into account.

Spectrum aggregation (or bandwidth aggregation, also referred to as carrier aggregation) supports a plurality of CCs. The spectrum aggregation is introduced to support an increasing throughput, to prevent a cost increase caused by using a broadband radio frequency (RF) element, and to ensure compatibility with legacy systems. For example, if 5 CCs are assigned as a granularity of a carrier unit having a bandwidth of 20 MHz, a bandwidth of up to 100 MHz can be supported.

Figure 5:
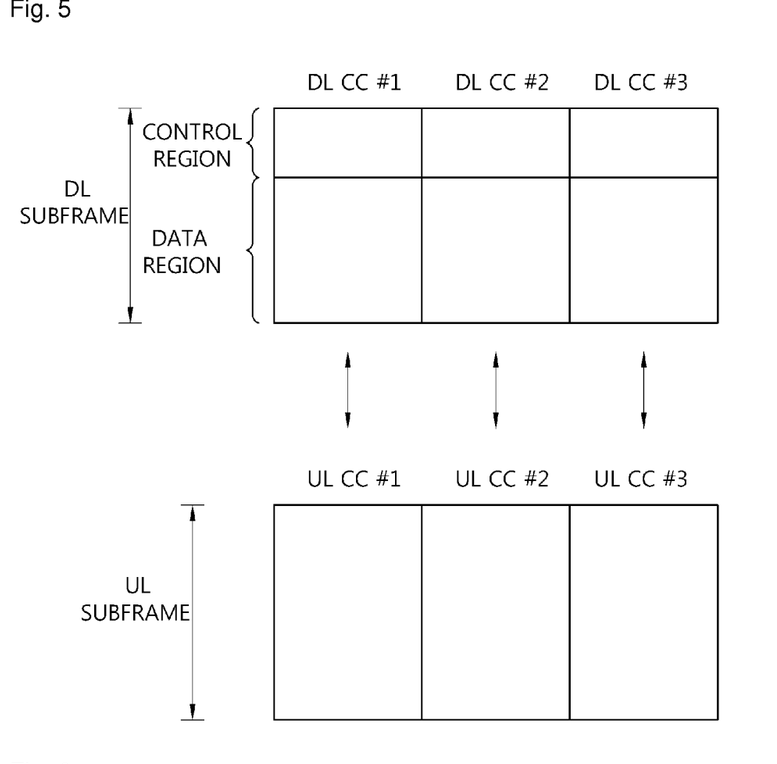
FIG. 5 shows an example of multiple carriers.

FIG. 5 shows an example of multiple carriers. Although 3 DL CCs and 3 UL CCs are shown herein, the number of DL CCs and the number of UL CCs are not limited thereto. In each DL CC, a PDCCH and a PDSCH are independently transmitted. In each UL CC, a PUCCH and a PUSCH are independently transmitted.

Cross-carrier scheduling may be possible among the plurality of CCs. That is, by using a DL grant (or UL grant) of a PDCCH of a DL CC #1, a PDSCH of a DL CC #2 (or a PUSCH transmitted over a UL CC #2 not linked to the DL CC #1) can be indicated.

Figure 6:
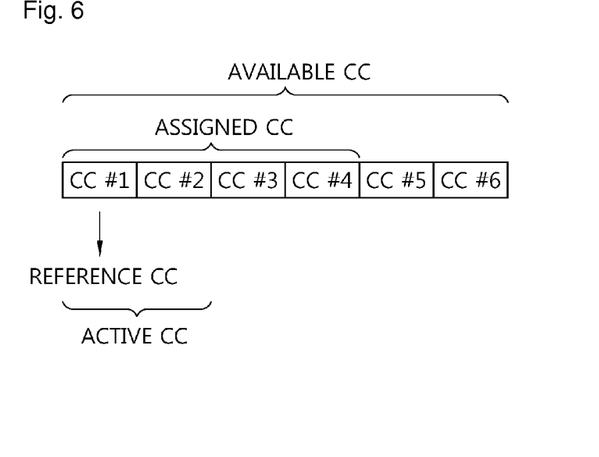
FIG. 6 shows exemplary management of multiple carriers.

FIG. 6 shows exemplary management of multiple carriers. Even if a multiple carrier system supports a plurality of CCs, the number of supported CCs may differ according to capability of a UE or a cell.

An available CC indicates all CCs that can be used by a system. Herein, 6 CCs, i.e., CC #1 to CC #6, are used.

An assigned CC is a CC assigned by a BS to the UE according to the capability of the UE. Although it is shown that the CC #1 to the CC #4 are assigned CCs, the number of assigned CCs may be less than or equal to the number of available CCs.

An active CC is a CC used by the UE to receive and/or transmit a control signal and/or data to/from the BS. The UE can perform PDCCH monitoring and/or PDSCH buffering with respect to some or all of active CCs. The active CC can be activated or inactivated among the assigned CCs. A CC which is always activated among the active CCs is referred to as a reference CC.

As the CCs are activated/inactivated, a CC currently being operating may be transferred. In this case, handling of HARQ previously being performed in a CC before the transfer may be problematic.

For example, assume that HARQ is being performed in the CC #2 which is the active CC of FIG. 6. The CC #2 is inactivated, and the CC #3 is activated. In this case, if an HARQ process being performed in the CC #2 is discarded and a new HARQ process is performed in the CC #3, a gain that can be obtained by conventional HARQ retransmission is limited.

A method in which the HARQ process being performed in a CC before the transfer (referred to as a source CC) can be subsequently performed also in a CC after the transfer (referred to as a target CC) is proposed. Therefore, a buffer of the HARQ process is maintained, and data which is not fully transmitted by using the source CC is retransmitted by using the target CC.

A transfer from the source CC to the target CC can be caused by various reasons such as inactivation of the source CC, de-allocation of the source CC, re-selection of the target CC caused by channel state deterioration of the source CC, a handover from the source CC to the target CC, etc., and technical features of the present invention are not limited thereto.

Although one source CC and one target CC are described for example hereinafter, the number of source CCs and the number of target CCs are not limited thereto. One or more HARQ processes performed in one or more source CCs can be transferred to one or more target CCs.

Figure 7:
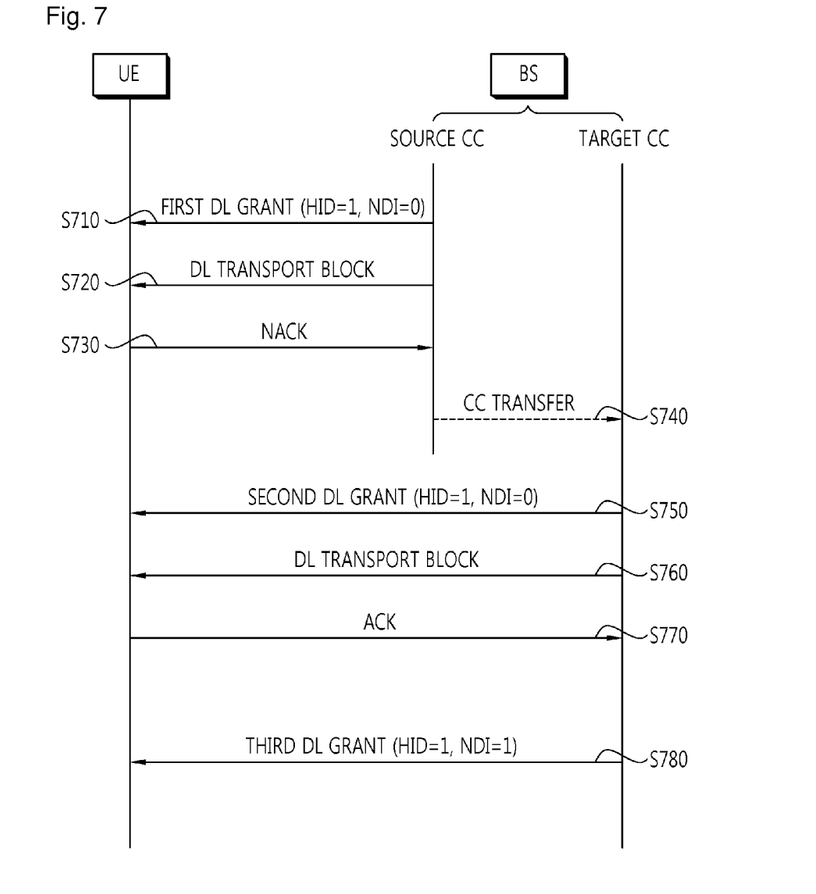
FIG. 7 is a flowchart showing a method of performing asynchronous HARQ according to an embodiment of the present invention.

FIG. 7 is a flowchart showing a method of performing asynchronous HARQ according to an embodiment of the present invention.

A UE (i.e., a receiver) receives a first DL grant on a PDCCH by using a source CC (step S710). The first DL grant includes an HARQ process index (HID) and an NDI, and it is assumed that HID=1 and NDI=0.

The UE receives a DL transport block on a PDSCH indicated by the first DL grant (step S720).

Due to a decoding error of the DL transport block, the UE sends a NACK signal on a PUCCH to a BS (step S730).

The source CC in which HARQ is being performed is transferred to a target CC (step S740). For example, due to channel deterioration of the source CC, the source CC may be inactivated and the target CC may be activated. The BS can report the activation of the target CC and/or the inactivation of the source CC to the UE by using a CC management message.

The UE receives a second DL grant on the PDCCH by using the target CC (step S750). It is assumed that the second DL grant includes HID=1 and NDI=0. The UE can recognize that the HARQ process corresponds to an HARQ process of the source CC on the basis of the HID received in the target CC. The UE recognizes it as the same HARQ process since the HID of the source CC is equal to the HID of the target CC.

In addition, the UE can use the NDI to determine whether retransmission is performed. If a current NDI value is toggled from an NDI value last received from the source CC, new transmission is recognized and thus the existing HARQ buffer is flushed. If the NDI value is not toggled, transmission is recognized as retransmission.

The UE receives a DL transport block retransmitted on the PDSCH indicated by the second DL grant (step S760).

The UE detects an error by combining the retransmitted DL transport block and the previously received DL transport block, and if there is no error, transmits an ACK signal on the PUCCH (step S770).

For new transmission, the BS transmits a third DL grant including HID=1 and NDI=1 by using the target CC on the PDCCH (step S780).

The UE can determine whether it is HARQ being performed in the source CC on the basis of the HID received from the target CC. Therefore, the UE and the BS can obtain a gain resulted from HARQ retransmission from the target CC.

The CC management message is used to report a transfer between CCs to the UE. For example, the BS may report to the UE the inactivation of the source CC and/or the activation of the target CC by using the CC management message. The CC management message can be transmitted by an RRC message or on the PDCCH. The CC management message can be transmitted by using a specific CC such as a reference CC.

Figure 8:
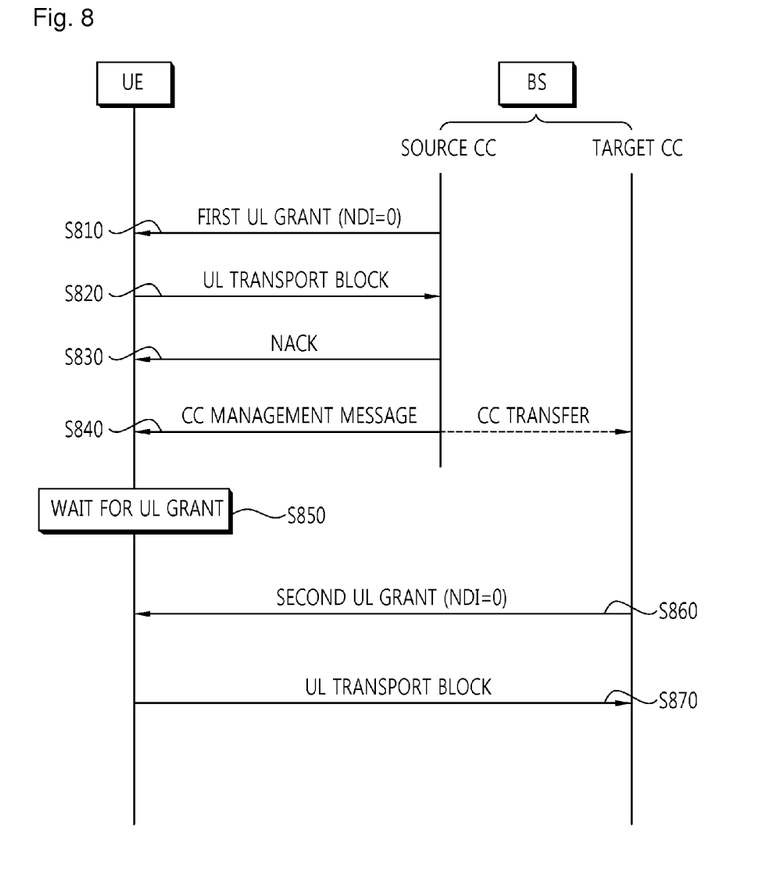
FIG. 8 is a flowchart showing a method of performing synchronous HARQ according to an embodiment of the present invention.

FIG. 8 is a flowchart showing a method of performing synchronous HARQ according to an embodiment of the present invention.

A UE receives a first UL grant for a source CC on a PDCCH (step S810). The first UL grant includes an NDI, and it is assumed that the NDI is set to 0.

The UE transmits a UL transport block on a PUSCH indicated by the first UL grant (step S820). In UL HARQ, an HID is determined according to a UL subframe in which the PUSCH is transmitted. Herein, it is assumed that the UL transport block is transmitted over the PUSCH in a UL subframe corresponding to HID=2.

Due to a decoding error of the UL transmission block, a BS sends a NACK signal to the UE on a PHICH (step S830).

The source CC in which HARQ is being performed is transferred to a target CC (step S840). The BS can report a transfer from the target CC to the source CC to the UE by using a CC management message.

The UE waits until a UL grant is received from the target CC (step S850). The UE suspends HARQ until the UL grant for the target CC is received, instead of sending retransmission according to an HARQ period. The UE can use a timer to suspend the HARQ. When a CC transfer is determined, the timer starts. If the UL grant is not received until the timer expires, an HARQ buffer is discarded.

The UE receives a second UL grant for the target CC on the PDCCH (step S860). It is assumed that the second UL grant includes NDI=0. The UE can know an HID from a UL subframe corresponding to the second UL grant. That is, if a PUSCH corresponding to a (k+r)-th UL subframe is sent upon receiving the second UL grant in a kth DL subframe, the UE can recognize whether the second UL grant is for a UL subframe corresponding to HID=2.

If the second UL grant corresponds to HID=2, the UE retransmits a UL transport block (step S870). If the UE receives a UL grant corresponding to an HID being performed in a previous source CC, it is recognized as the same HARQ process.

The UE can use an NDI included in the UL grant to determine whether retransmission is performed. If a current NDI value is toggled from an NDI value last received from the source CC, new transmission is recognized and thus the existing HARQ buffer is flushed. If the NDI value is not toggled, transmission is recognized as retransmission.

An HID corresponding to a UL subframe in which a PUSCH is to be transmitted is used to determine to which HARQ process of the source CC an HARQ process of the target CC is related. According to the determination result, the UE and the BS can obtain a gain resulted from HARQ retransmission from the target CC.

Meanwhile, in case of SPS, activation of the SPS and transmission/reception of the SPS are performed on the basis of an SPS configuration including an SPS period. That is, RRC signaling is first performed to determine in which subframe the transmission/reception of the SPS is performed, and thereafter a PDCCH is used to activate or release the SPS.

In multiple carriers, the same SPS configuration can be determined to all CCs. This is referred to as a common SPS configuration. Since all CCs use the common SPS configuration, even if a CC transfer occurs, the target CC does not have to additionally receive the common SPS configuration.

Figure 9:
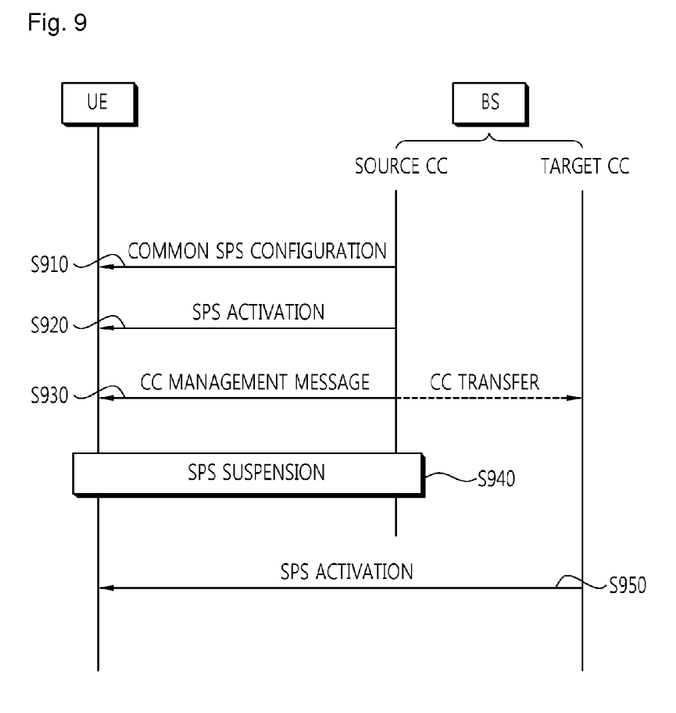
FIG. 9 is a flowchart showing an SPS configuration according to an embodiment of the present invention.

FIG. 9 is a flowchart showing an SPS configuration according to an embodiment of the present invention.

A UE receives a common SPS configuration from a source CC (step S910). The common SPS configuration can be received in a process of initial access to a BS or after an RRC connection is established. The common SPS configuration can be received by using a reference CC or another CC, instead of the source CC.

The UE receives an SPS activation from the BS over a PDCCH, and thereafter performs SPS in the source CC (step S920).

The source CC is transferred to a target CC, and the BS can report to the UE a transfer from the target CC to the source CC by using a CC management message (step S930).

Even if an SPS inactivation is not received, the UE autonomously suspends the SPS (step S940).

The UE receives the SPS activation from the BS over the PDCCH, and thereafter performs SPS in the target CC (step S950).

An HARQ process not completed in the source CC can be performed subsequently in the target CC. As shown in the embodiment of FIG. 7, in the asynchronous HARQ, after receiving the DL grant for the target CC, the UE can subsequently perform the existing HARQ process if an HID included in the DL grant is equal to a previous HID and indicates retransmission. As shown in the embodiment of FIG. 8, in the synchronous HARQ, after receiving the UL grant for the target CC, the UE can continuously perform the existing HARQ having the same HID as the previous HID.

Even if a CC in which the HARQ is currently being performed is transferred, the UE and the BS can maintain an HARQ buffer until new transmission starts.

Figure 10:
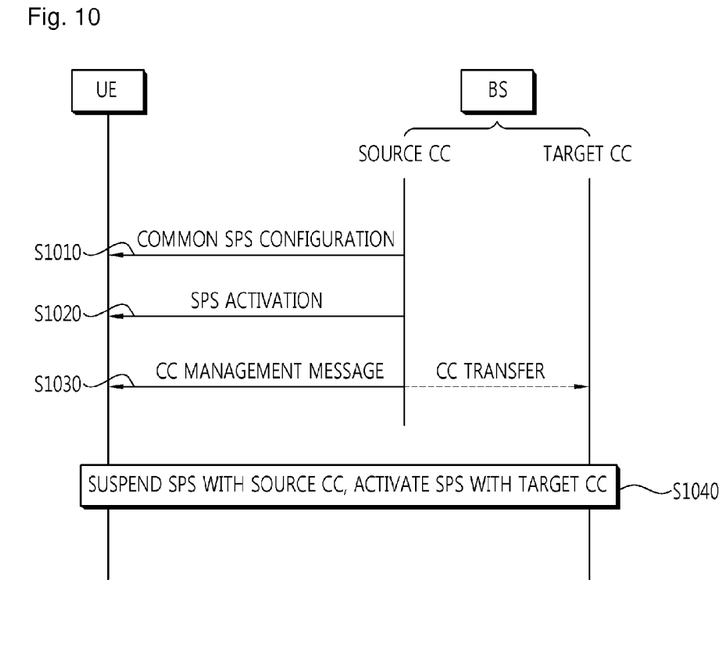
FIG. 10 is a flowchart showing an SPS configuration according to an embodiment of the present invention.

FIG. 10 is a flowchart showing an SPS configuration according to an embodiment of the present invention.

A UE receives a common SPS configuration from a source CC (step S1010). The common SPS configuration can be received in a process of initial access to a BS or after an RRC connection is established. The common SPS configuration can be received by using a reference CC or another CC, instead of the source CC.

The UE receives an SPS activation from the BS over a PDCCH, and thereafter performs SPS in the source CC (step S1020).

The source CC is transferred to a target CC, and the BS can report to the UE a transfer from the target CC to the source CC by using a CC management message (step S1030).

After receiving the CC management message, the UE autonomously suspends the SPS performed with respect to the source CC, and activates the SPS with respect to the target CC (step S1040). Due to a CC transfer, the SPS is autonomously succeeded, without having to receive an additional SPS activation from the target CC.

For optimization of resource utilization, an HARQ process not completed in the source CC can be succeeded to the target CC. This is the same as the embodiments of FIG. 7 and FIG. 8. Alternatively, to avoid collision of resource scheduling, the HARQ process not completed in the source CC can be discarded.

Figure 11:
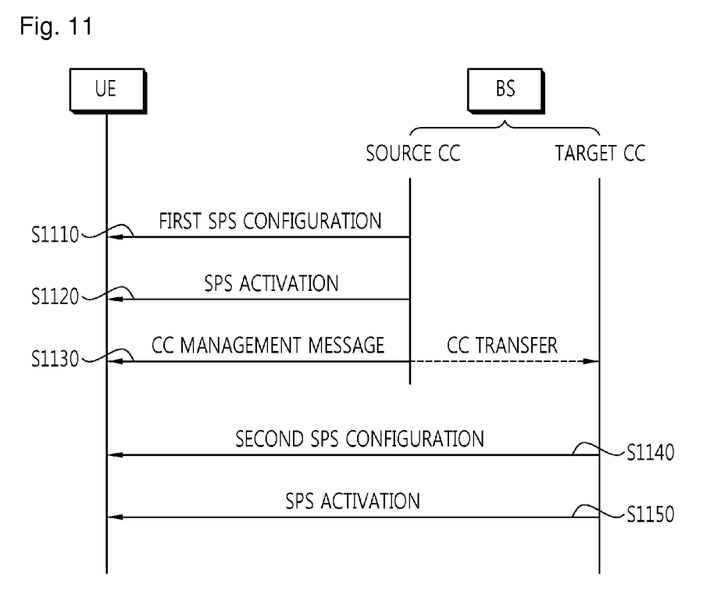
FIG. 11 is a flowchart showing an SPS configuration according to an embodiment of the present invention.

FIG. 11 is a flowchart showing an SPS configuration according to an embodiment of the present invention. Unlike the embodiments of FIG. 9 and FIG. 10, the SPS configuration is given for each CC in the present embodiment.

A UE receives a first SPS configuration from a source CC (step S1110). The first SPS configuration is an SPS configuration applied only to the source CC.

After receiving the SPS activation from a BS over a PDCCH, the UE performs SPS in the source CC (step S1120).

The source CC is transferred to a target CC, and the BS can report to the UE a transfer from the target CC to the source CC by using a CC management message (step S1130).

The UE receives a second SPS configuration from the target CC (step S1140). The second SPS configuration is an SPS configuration applied only to the target CC. If the target CC is pre-activated, the second SPS configuration can be received by the UE anytime before receiving the CC management message.

The UE receives the SPS activation from the BS over the PDCCH and thereafter performs SPS in the target CC (step S1150).

An HARQ process not completed in the source CC can be performed subsequently in the target CC. As shown in the embodiment of FIG. 8, in the asynchronous HARQ, after receiving the DL grant for the target CC, the UE can continuously perform the existing HARQ process if an HID included in the DL grant is equal to a previous HID and indicates retransmission. As shown in the embodiment of FIG. 9, in the synchronous HARQ, after receiving the UL grant for the target CC, the UE can continuously perform the existing HARQ having the same HID as the previous HID.

More specifically, in DL asynchronous HARQ, the UE and the BS can operate as follows.

The UE recognizes an HID according to PDSCH transmission timing and the number of HARQ processes obtained by using RRC signaling. By using an NDI and an HID included in a DL grant over a PDCCH, the UE can know whether the same HARQ process is performed and whether retransmission is performed.

With respect to the same HARQ process corresponding to the source CC and the target CC, if an NDI value in a PDCCH for the target CC is set to 1, it is recognized as retransmission.

Since new transmission is configured semi-persistently, scheduling on the new transmission does not exist separately.

In UL synchronous HARQ, the UE and the BS can operate as follows.

In the synchronous HARQ, an HID is predetermined according to a subframe in which an initial PUSCH is transmitted. Therefore, the UE can recognize to which HARQ process of the source CC the HARQ of the target CC correspond, on the basis of the HID corresponding to the subframe in which the PUSCH is transmitted in the target CC.

With respect to the same HARQ process corresponding to the source CC and the target CC, if an NDI value in a PDCCH for the target CC is set to 1, it is recognized as retransmission.

Since new transmission is configured semi-persistently, scheduling on the new transmission does not exist separately.

Figure 12:
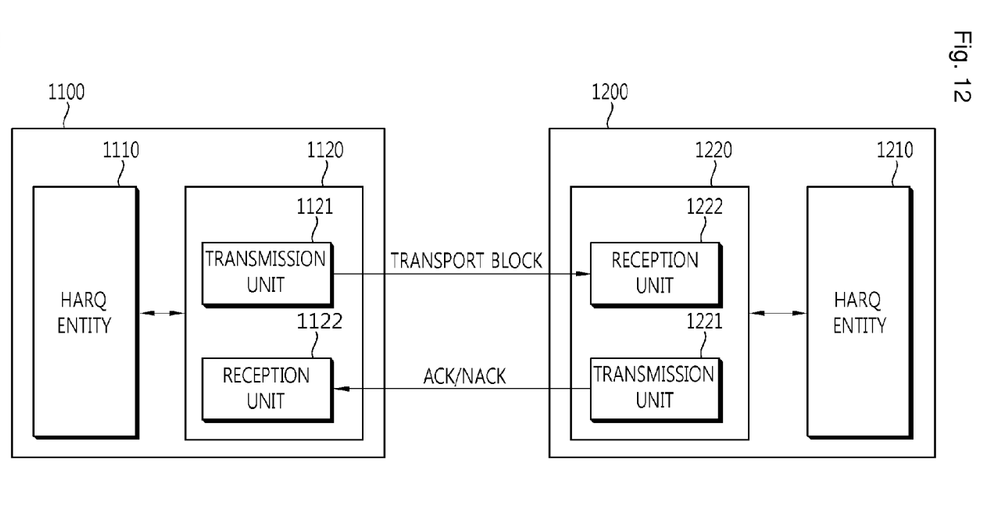
FIG. 12 is a block diagram of a transmitter and a receiver for implementing an embodiment of the present invention.

FIG. 12 is a block diagram of a transmitter and a receiver for implementing an embodiment of the present invention.

A transmitter 1100 performs transmission of a transfer block in the embodiments of FIG. 7 to FIG. 11. The transmitter 1100 performs an operation of a BS in DL HARQ, and performs an operation of a UE in UL HARQ.

The transmitter 1100 supports multiple carriers, and includes an HARQ entity 1110 and a physical entity 1120. The physical entity 1120 includes a transmission unit 1121 and a reception unit 1122.

The HARQ entity 1110 implements an HARQ operation in the embodiments of FIG. 7 to FIG. 11. The HARQ entity 1110 manages an HARQ process on the basis of an HID, and recognizes whether to perform retransmission on the basis of an NDI.

The transmission unit 1121 transmits the transport block. The reception unit 1122 receives an ACK/NACK signal as a reception acknowledgement for the transport block. On the basis of the reception acknowledgement, the HARQ entity 1110 can retransmit the transport block.

The receiver 1200 receives the transport block and transmits the ACK/NACK signal in the embodiments of FIG. 7 to FIG. 11. The receiver 1200 performs the operation of the UE in DL HARQ and performs the operation of the BS in UL HARQ.

The receiver 1200 supports multiple carriers, and includes an HARQ entity 1210 and a physical entity 1220. The physical entity 1220 includes a transmission unit 1221 and a reception unit 1222.

The HARQ entity 1210 implements an HARQ operation in the embodiments of FIG. 7 to FIG. 11.

The reception unit 1222 receives the transport block. The transmission unit 1221 transmits an ACK/NACK signal as a reception acknowledgement for the transport block. On the basis of the reception acknowledgement, the reception unit 1222 can receive retransmission of the transport block.

The HARQ entity and the physical entity can be implemented in hardware, or may be a protocol implemented by a processor (not shown). The protocol is stored in a memory (not shown), and is executed by the processor.

Figure 13:
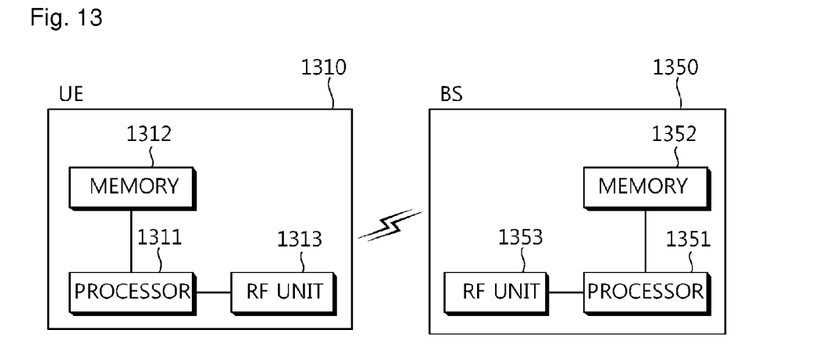
FIG. 13 is a block diagram of a wireless communication system for implementing an embodiment of the present invention.

FIG. 19 is a block diagram showing wireless communication system to implement an embodiment of the present invention.

A UE 1310 may include a processor 1311, a memory 1312 and a radio frequency (RF) unit 1313.

The processor 1311 may be configured to implement proposed functions, procedures and/or methods described in this description. Operations of a UE in the embodiments of FIG. 7 to FIG. 11 can be implemented by the processor 1311. The memory 1312 is operatively coupled with the processor 1311 and stores parameters and/or protocols for HARQ operation. The RF unit 1313 is operatively coupled with the processor 1311, and transmits and/or receives a radio signal.

A BS 1350 may include a processor 1351, a memory 1352 and a radio frequency (RF) unit 1353.

The processor 1351 may be configured to implement proposed functions, procedures and/or methods described in this description. Operations of a BS in the embodiments of FIG. 7 to FIG. 11 can be implemented by the processor 1351. The memory 1512 is operatively coupled with the processor 1311 and stores parameters and/or protocols for HARQ operation. The RF unit 1353 is operatively coupled with the processor 1351, and transmits and/or receives a radio signal.

The processor may include application-specific integrated circuit (ASIC), other chipset, logic circuit and/or data processing device. The memory may include read-only memory (ROM), random access memory (RAM), flash memory, memory card, storage medium and/or other storage device. The RF unit may include baseband circuitry to process radio frequency signals. When the embodiments are implemented in software, the techniques described herein can be implemented with modules (e.g., procedures, functions, and so on) that perform the functions described herein. The modules can be stored in memory and executed by the processor. The memory can be implemented within the processor or external to the processor in which case those can be communicatively coupled to the processor via various means as is known in the art.

In view of the exemplary systems described herein, methodologies that may be implemented in accordance with the disclosed subject matter have been described with reference to several flow diagrams. While for purposed of simplicity, the methodologies are shown and described as a series of steps or blocks, it is to be understood and appreciated that the claimed subject matter is not limited by the order of the steps or blocks, as some steps may occur in different orders or concurrently with other steps from what is depicted and described herein. Moreover, one skilled in the art would understand that the steps illustrated in the flow diagram are not exclusive and other steps may be included or one or more of the steps in the example flow diagram may be deleted without affecting the scope and spirit of the present disclosure.

What has been described above includes examples of the various aspects. It is, of course, not possible to describe every conceivable combination of components or methodologies for purposes of describing the various aspects, but one of ordinary skill in the art may recognize that many further combinations and permutations are possible. Accordingly, the subject specification is intended to embrace all such alternations.

The invention claimed is:

1. A method of performing hybrid automatic repeat request (HARQ) by a user equipment in a multiple carrier system, the method comprising:
receiving a first downlink grant on a downlink control channel through a first component carrier, the first downlink grant including a first HARQ process index (HID) indicating an HARQ process index and a first new data indicator (NDI) indicating a new transmission or a retransmission;
receiving a downlink transfer block on the downlink data channel indicated by a resource allocation in the first downlink grant through the first component carrier;
transmitting a NACK signal for the downlink transport block;
receiving a second downlink grant on the downlink control channel through a second component carrier different from the first component carrier, the second downlink grant including a second HID indicating same HARQ process as the first HID and a second NDI indicating a retransmission of the downlink transfer block which has been transmitted through the first component carrier; and
receiving the retransmission of the downlink transfer block through the second component carrier.

2. The method of claim 1, wherein if the second NDI is set to 1, the retransmission is indicated.

3. The method of claim 1, wherein a value of the first HID is same as a value of the second HID.

4. The method of claim 1, wherein the downlink transfer block is used for a semi-persistent scheduling (SPS).

5. The method of claim 1, further comprising:
receiving a management message regarding a transfer from the first component carrier to the second component carrier.

6. A user equipment comprising:
a radio frequency (RF) unit for transmitting and receiving a radio signal; and
a processor, coupled to the RF unit, for performing hybrid automatic repeat request (HARQ), and configured to:
receive a first downlink grant on a downlink control channel through a first component carrier, the first downlink grant including a first HARQ process index (HID) indicating an HARQ process index and a first new data indicator (NDI) indicating a new transmission or a retransmission;
receive a downlink transfer block on the downlink data channel indicated by a resource allocation in the first downlink grant through the first component carrier;
transmit a NACK signal for the downlink transport block;
receive a second downlink grant on the downlink control channel through a second component carrier different from the first component carrier, the second downlink grant including a second HID indicating same HARQ process as the first HID and a second NDI indicating a retransmission of the downlink transfer block which has been transmitted through the first component carrier; and
receive the retransmission of the downlink transfer block through the second component carrier.

7. The user equipment of claim 6, wherein if the second NDI is set to 1, the retransmission is indicated.

8. The user equipment of claim 6, wherein a value of the first HID is same as a value of the second HID.

9. The user equipment of claim 6, wherein the downlink transfer block is used for a semi-persistent scheduling (SPS).

10. The user equipment of claim 6, wherein the processor is further configured to receive a management message regarding a transfer from the first component carrier to the second component carrier.

* * * * *